(12) United States Patent
Foiret et al.

(10) Patent No.: US 9,896,958 B2
(45) Date of Patent: Feb. 20, 2018

(54) METHOD FOR MONITORING AN IGNITION SEQUENCE OF A TURBOMACHINE ENGINE (71) Applicant: SNECMA, Paris (FR)

(72) Inventors: Guilhem Foiret, Paris (FR); Francois Demaison, Nandy (FR); Benjamin Pierre Lamoureux, Paris (FR)

(73) Assignee: SNECMA, Paris (FR)

( * ) Notice: Subject to any disclaimer, the term of this patent is extended or adjusted under 35 U.S.C. 154(b) by 245 days.

(21) Appl. No.: 14/441,002

(22) PCT Filed: Nov. 8, 2013

(86) PCT No.: PCT/FR2013/052677
§ 371 (c)(1),
(2) Date: May 6, 2015

(87) PCT Pub. No.: WO2014/072652
PCT Pub. Date: May 15, 2014

(65) Prior Publication Data
US 2015/0285093 A1 Oct. 8, 2015

(30) Foreign Application Priority Data
Nov. 12, 2012 (FR) ...................................... 12 60744

(51) Int. Cl.
*F01D 21/00* (2006.01)
*F02C 7/26* (2006.01)

(52) U.S. Cl.
CPC .............. *F01D 21/003* (2013.01); *F02C 7/26* (2013.01); *F05D 2260/80* (2013.01); *F05D 2260/85* (2013.01)

(58) Field of Classification Search
CPC ...... F01D 21/003; F02C 7/26; F05D 2260/80; F05D 2260/85
See application file for complete search history.

(56) References Cited

U.S. PATENT DOCUMENTS 5,748,500 A * 5/1998 Quentin .................... G07C 3/00
702/182
6,470,258 B1 * 10/2002 Leamy ...................... F02C 7/26
701/100
(Continued)

FOREIGN PATENT DOCUMENTS

EP 2256319 A2 12/2010
FR 2942001 A1 8/2010

OTHER PUBLICATIONS

International Search Report dated Feb. 17, 2014 in PCT/FR2013/052677 filed Nov. 8, 2013.
(Continued)

*Primary Examiner* — Freddie Kirkland, III
(74) *Attorney, Agent, or Firm* — Oblon, McClelland, Maier & Neustadt, L.L.P.

(57) ABSTRACT

A method for monitoring an ignition sequence of an engine, in particular a turbomachine engine, including the following steps: (i) defining an ignition time of the engine for a defined starting parameter, (ii) comparing the ignition time of the engine defined in this way with a reference ignition time expected for a reference engine and for this starting parameter, (iii) deducing an indicator of the bringing into operation of the engine, (iv) repeating steps (i) to (iii) for this starting parameter, for each bringing into operation of the engine of the sequence, and (v) on the basis of the change in the indicator, generating a degradation alert for the ignition sequence of the engine.

5 Claims, 5 Drawing Sheets

(56) References Cited

U.S. PATENT DOCUMENTS

| | | | | |
|---|---|---|---|---|
| 6,868,325 B2* | 3/2005 | Menon | .................... | F02C 9/00 |
| | | | | 701/100 |
| 7,124,019 B2* | 10/2006 | Goodell | ................ | F02P 17/12 |
| | | | | 324/388 |
| 7,369,932 B2* | 5/2008 | Kim | ...................... | F01D 21/00 |
| | | | | 477/30 |
| 7,506,517 B2* | 3/2009 | Uluyol | .................... | F02C 7/26 |
| | | | | 123/305 |
| 8,370,045 B2* | 2/2013 | Qiu | ....................... | F01D 19/00 |
| | | | | 415/13 |
| 8,467,949 B2* | 6/2013 | Kim | ........................ | F02C 7/26 |
| | | | | 701/100 |
| 8,838,359 B2* | 9/2014 | Qiu | ....................... | F01D 19/00 |
| | | | | 415/13 |
| 8,862,364 B2* | 10/2014 | Kim | ........................ | F02C 7/26 |
| | | | | 340/4.32 |
| 9,472,026 B2* | 10/2016 | Gerez | ................... | F01D 19/02 |
| 2004/0176879 A1 | 9/2004 | Menon et al. | | |
| 2007/0260390 A1 | 11/2007 | Kim et al. | | |
| 2010/0303611 A1* | 12/2010 | Kim | ........................ | F02C 7/26 |
| | | | | 415/118 |
| 2011/0040470 A1 | 2/2011 | Qiu et al. | | |
| 2013/0133306 A1 | 5/2013 | Qiu et al. | | |
| 2013/0173135 A1* | 7/2013 | Kim | ........................ | F02C 7/26 |
| | | | | 701/100 |

OTHER PUBLICATIONS

French Preliminary Search Report dated Aug. 22, 2013 in Patent Application No. FR 1260744 (with English translation of categories of cited documents).

* cited by examiner

METHOD FOR MONITORING AN IGNITION SEQUENCE OF A TURBOMACHINE ENGINE

FIELD OF THE INVENTION

The invention generally relates to turbomachines, notably turbine engines and airplane turboprop engines and industrial gas turbine engines.

More specifically, the invention relates to the monitoring of degradations of a system which may have an impact on the proper progress of a sequence for starting operation of an engine of a turbomachine.

TECHNOLOGICAL BACKGROUND

A poor sequence for starting operation of a turbomachine engine may notably be expressed by poor ignition of the fuel-air mixture in the engine. The lack of ignition may have several origins, including insufficient fuel or even lack of fuel, metering, or injectors, or inadequacy or absence of energy, which may result from the degradation of the fuel pump or further from the system generating sparks.

Generally, the degradation of the system of the engine which comes into play in a sequence for starting the engine is monitored by means of the duration for igniting the fuel-air mixture, which is defined as the time interval between fuel injection into the combustion chamber of the engine and detection of the ignition of this mixture.

Thus, for a given engine, the ignition duration is used as an indicator of the degradation of the system used in the starting of an engine of a turbomachine. This indicator is therefore tracked over time, by a measurement at each starting of the engine, and an alert may be lifted in the case of confirmed deviation of the ignition duration with respect to a reference duration. It is then possible to anticipate possible of failures of the engine and to check the system in order to limit possible costs generated by non-starting of the engine.

For example, documents FR 2 942 001 and US 2007/026030 describe a method for monitoring the health condition of equipment involved in the starting capability of an engine, during which the ignition duration is inter alia determined and the obtained value is compared with an expected reference ignition duration for a reference engine, in order to infer therefrom if a piece of equipment of the engine has an anomaly.

However, the use of the ignition duration as an indicator is limited since its measurement exhibits a too large dispersion to be utilizable, given that it may vary according to the starting conditions of the engine without the system itself necessarily being modified. The graph of FIG. 1A, which shows the time-dependent change of the starting duration during five hundred consecutive starts for a given "sound" engine, i.e. undamaged, illustrates this dispersion, while the graph of FIG. 1B, which shows the smoothed time-dependency over five consecutive starts of this indicator, illustrates the noise resulting from this dispersion. Now, this noise is much too large for reliably detecting degradations of the starting system of the engine. The standard deviation is actually of the order of 1.2 so that only degradations of great intensity may be detected.

Document EP 2 256 319, as for it, describes a method for tracking performances of the engine during which various parameters are measured and then compared with values recorded beforehand in order to identify possible anomalies.

Generally, the monitoring methods of the prior art propose the monitoring of a large number of parameters in order to more easily identify the piece of equipment at the origin of the anomaly. Nevertheless, these methods are generally cumbersome to apply and require many sensors. Moreover, they do not give the possibility of sufficiently taking into account the environment of the engine, which may however affect the value of the parameters which are monitored without the pieces of equipment of the engine involved in its ignition however having been subject to degradations.

SUMMARY OF THE INVENTION

An object of the invention is therefore to propose a method for monitoring a sequence for starting operation of an engine of a turbomachine, allowing a reliable determination of the degradations of the whole or part of the system of the engine coming into play during starting operation of the turbomachine in order to improve prediction of failures, which is fast, simple and inexpensive to apply.

For this, the invention proposes a method for monitoring an ignition sequence of an engine, notably of a turbomachine, comprising the following steps:
(i) determining an ignition duration of the engine for a determined starting parameter,
(ii) comparing the thereby determined ignition duration of the engine with an expected reference ignition duration for a reference engine and for this starting parameter,
(iii) inferring an indicator for starting operation of the engine,
(iv) repeating steps (i) to (iii) for this starting parameter, for each starting operation of the engine of the sequence, and
(v) depending on the time-dependent change of the indicator, generating an alert for degradation of the ignition sequence of the engine.

Certain preferred but non-limiting features of the monitoring method are the following:
the starting parameter comprises at least one of the parameters from the following list:
 a thermal condition of the engine during the sequence for starting operation of the latter,
 starting on the ground or starting during flight,
 an altitude at which the engine starts,
 an ambient pressure,
 a rotational engine speed of the engine corresponding to injection of fuel into a combustion chamber of the engine,
 a fuel flow rate injected into a combustion chamber upon ignition,
 air characteristics at the inlet of a combustion chamber of the engine,
the ignition durations are determined from a number of discharges of an ignition spark plug of the engine required for bringing the engine into operation,
during the comparison step, a difference between the number of discharges of the ignition spark plug of the engine required for bringing the engine into operation, with an expected number of discharges of an ignition spark plug for bringing the reference engine into operation, is determined,
a degradation alert is generated when the indicator is greater than or equal to a determined threshold,
the engine comprises two ignition spark plugs, and the indicator is determined independently for each ignition spark plug, and
it further comprises a step during which a set of reference ignition durations is determined for a given reference engine and for a set of starting parameter values.

The invention also proposes a computer program product comprising code instructions for executing such a monitoring method, a storage means which is legible by a piece of computer equipment on which such a computer program product comprises code instructions for executing the monitoring method, as well as an associated monitoring system.

SHORT DESCRIPTION OF THE DRAWINGS

Other features, objects and advantages of the present invention will become better apparent upon reading the detailed description which follows, made with reference to the appended figures given as non-limiting examples and wherein.

DETAILED DESCRIPTION OF AN EMBODIMENT

The invention proposes monitoring of a sequence for starting operation of an engine, and notably of a turbomachine, by determining the context for starting the engine, in order to be able to measure and compare, in this context, the ignition duration of the engine with a reference ignition duration.

The ignition duration of an engine of a turbomachine during a sequence for starting operation notably depends on three data.

A first datum relates to the quality of the airflow at the outlet of the high pressure compressor of the engine. If this flow is too large (for example subsequent to a discharge delay of an ignition spark plug during the sequence for starting operation) or of poor quality (due to radial or azimuthal distortion of the flow velocity profiles), the air supply of the combustion chamber of the engine that may be degraded, which may influence the ignition of the engine.

A second datum relates to the amount of fuel and to its spraying by the injectors into the combustion chamber. Indeed, like for supplying air to the chamber, the degradation of an injector (coking of the stagnating fuel in the injector or a deviation of the flow rate/pressure characteristic) may perturb the flow of the fuel and form pockets of instability around the combustion chamber.

A third datum relates to the quality of the energy brought by the combustion of the fuel-air mixture. It is actually required that the ignition system, formed by the casing, the cables and the spark plugs be of good quality and deliver the required amount of energy, being aware that a portion of the energy is also brought by the engine which is not adiabatic.

It is therefore inferred therefrom that the quality, and therefore the duration of the ignition, mainly depend on the condition of the various systems involved in the starting operation of the machine, as well as on the starting context of the engine of the turbomachine.

The monitoring method 1 therefore proposes the removal of all or part of the influence of the context for starting operation of the engine 10, in order to be able to identifying possible degradation of these systems.

The application context of the engine comprises the whole of the starting parameters which may have an influence on the ignition duration of the engine. These starting parameters are variable, and may notably comprise:
- the thermal condition of the engine upon starting,
- the fact that starting operation is accomplished on the ground or during flight,
- the altitude at which the engine starts,
- the ambient pressure,
- the rotational speed of the engine corresponding to fuel injection into the combustion chamber,
- the fuel flow rate injected into the combustion chamber upon ignition,
- the air characteristics at the inlet in the combustion chamber.

The Applicant realized that the thermal condition of the engine was one of the starting parameters having the greatest influence on the ignition duration of the engine of the turbomachine. However the other starting parameters may also be used for monitoring the starting of the operation of the engine of a turbomachine, either alone or as a combination.

In the following, an exemplary application of a monitoring method 1 according to the invention will be described by using the thermal condition of the engine upon starting operation of the engine as a starting parameter.

The thermal condition of the engine upon starting operation of the engine, i.e. during its starting, may notably be estimated by measuring the exhaust temperature of the EGT gases of the engine at a given section thereof, for example by means of a thermocouple. These may for example be T49.5 thermocouples which are customarily used in the distributors of the low pressure turbine of the turbomachine, downstream from the combustion chamber. Reference may notably be made to French patent application FR 2 971 543 in the name of the Applicant for more information relating to the determination of the thermal condition upon starting the engine by means of the exhaust temperature of the EGT gases.

Alternatively, the thermal condition of the engine may also be estimated by determining the elapsed time since the last stopping of the engine, or the case temperature (Tcase).

During the method 1 for monitoring starting of the operation of the engine, the thermal condition of the engine is determined 20, and then the duration of the ignition of the engine is estimated 30 in this thermal condition (or vice versa). The thereby obtained duration may then be compared 50 with a reference ignition duration, determined beforehand for a reference motor, preferably of the same type as the engine of the turbomachine, and for a similar or identical thermal condition. Therefore the value measured for the ignition duration is not simply compared with a recorded threshold in the system, but with the value which the ignition duration should have if the engine was sound, under identical or similar starting conditions, these starting conditions being set by the thermal condition of the engine upon measurement. According to the difference between the measured value and the reference ignition duration for this thermal condition, it is then possible to determine whether the ignition sequence is degraded or not, and generate 90 an alert if necessary.

Figure 1A:
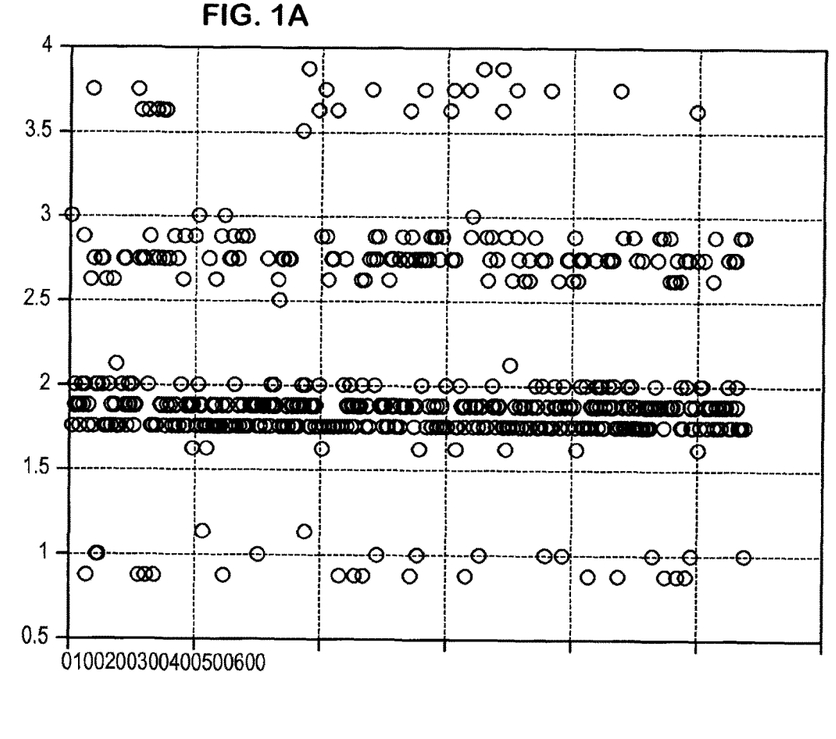
FIG. 1A is a graph illustrating, for a given engine example, ignition durations (in seconds) versus the number of starts.
Figure 1B:
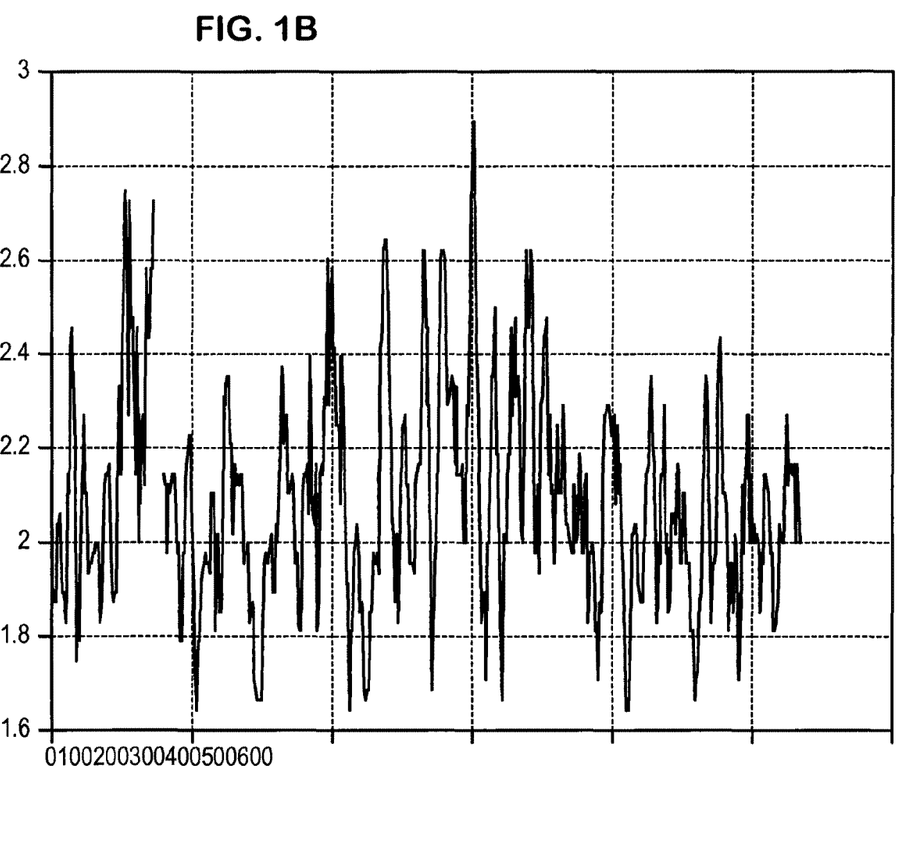
FIG. 1B illustrates the smoothed time-dependent change in the ignition duration averaged over five consecutive starts (in seconds) versus the number of starts.

The ignition duration may be difficult to measure rapidly and reliably. The measurements actually have an inaccuracy of the order of 125 ms, which causes a slight dispersion of the ignition durations around four plateaus, as illustrated in FIG. 1A. Therefore a proposal is made for converting the ignition duration, measured by determining the elapsed time between the fuel injection into the combustion chamber of the engine and the detection of the ignition of the fuel-air mixture, into a number of required discharges of the ignition spark plug for igniting the fuel-air mixture. Indeed, initiation of the combustion of the mixture can only take place upon generating a spark with the ignition spark plug. As the discharge frequency of the ignition spark plugs is known, fear of the order of 1.25 Hz, it is then possible to easily convert a given ignition duration into a number of discharges which have been necessary for bringing the engine into operation. It is then possible to estimate 30 the ignition duration in a more accurate way than by measuring it directly.

Figure 2:
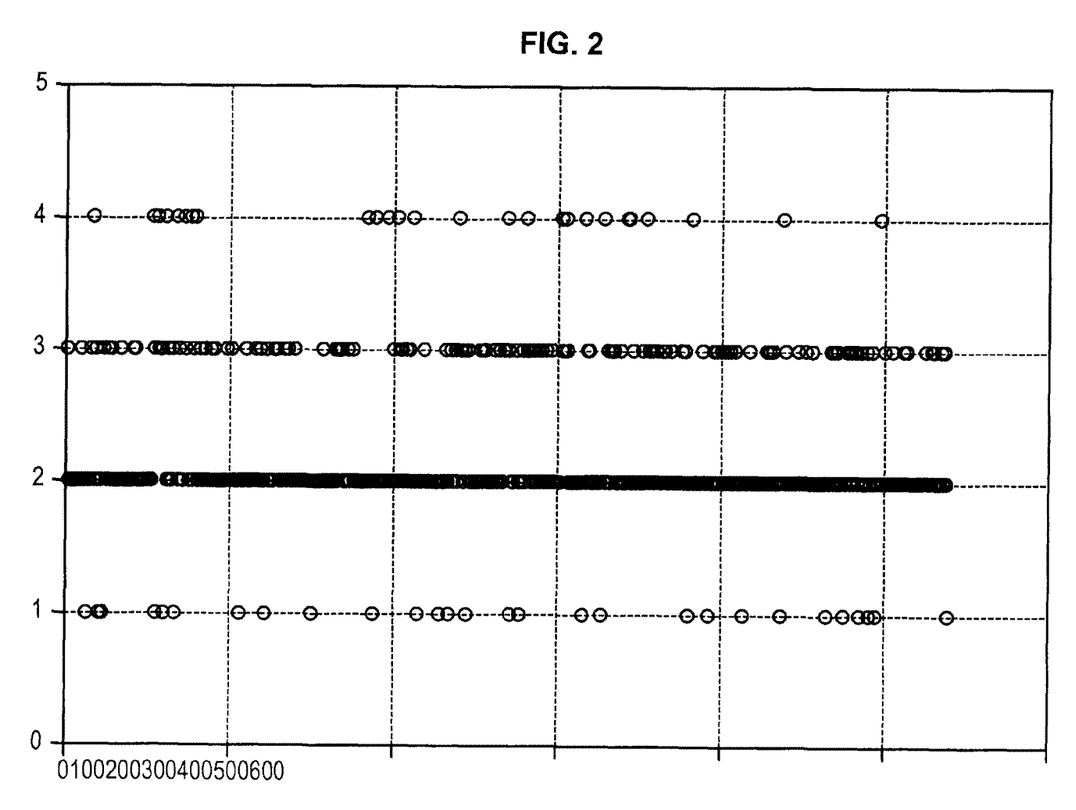
FIG. 2 is a graph in which the ignition durations of the graph of FIG. 1A have been converted into a number of required discharges of the ignition spark plug versus the number of starts.

The thereby obtained graph is illustrated in FIG. 2, in which the ignition durations have been converted into a number of required discharges, which is an integer which may assume discrete values comprised here between 1 and 4, which not only allows simplification of the measurement of the ignition duration, but additionally gives the possibility of reducing the uncertainties on the measurements and facilitating subsequent comparison steps 50.

The number of discharges of a given spark plug of a given reference engine, and therefore its ignition duration, may then be measured simply and reliably for a set of different thermal condition values, for example for exhaust gas temperatures (EGT) ranging from 0° C. to 600° C. It will be noted that by reference engine, is meant here an engine of a type similar to or identical with the engine which is desirably monitored, the system of which coming into play in the starting of the engine does not have a any failure and therefore gives the possibility of obtaining sound measurements.

It is then possible to build 40, for this reference engine, a database allowing definition of the number of expected discharges for a given thermal condition of the engine.

Figure 3:
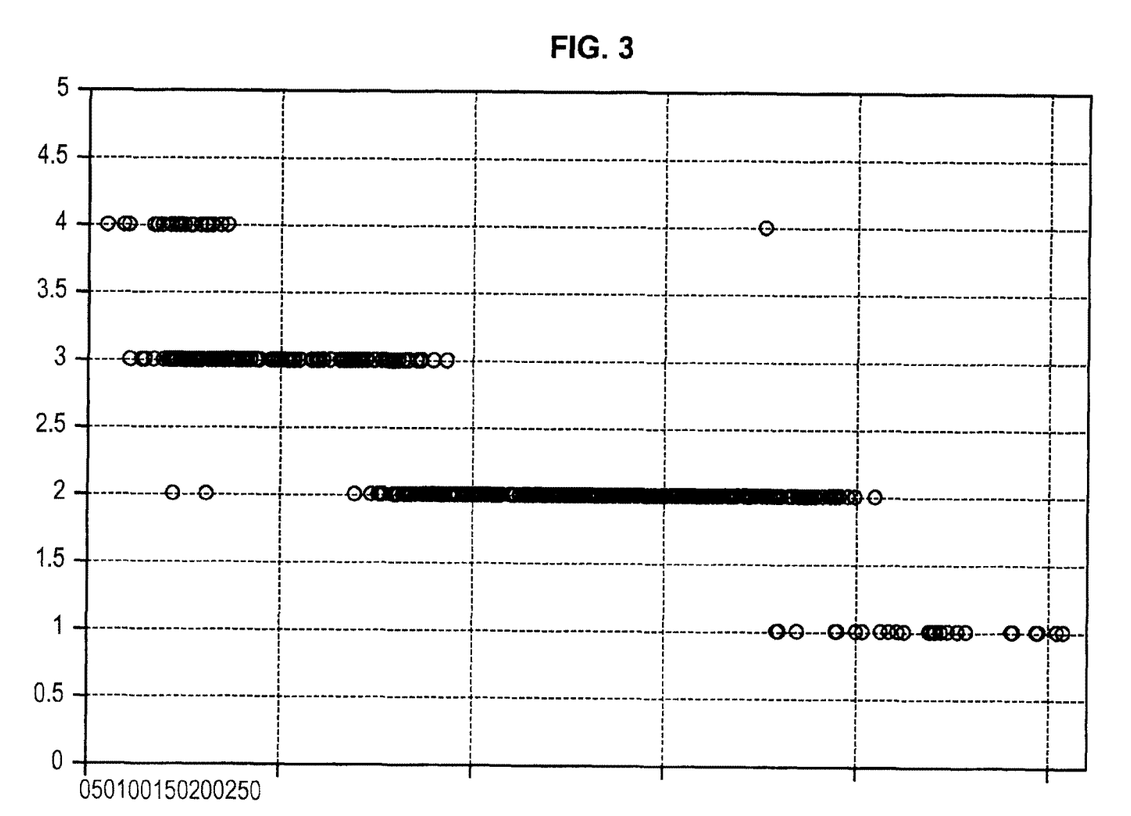
FIG. 3 is a graph illustrating, for a reference engine example, the number of required discharges of the ignition spark plug in order to bring the reference engine into operation, versus a starting parameter example, here the thermal condition of the reference engine (EGT temperature in ° C.)
Figure 4:
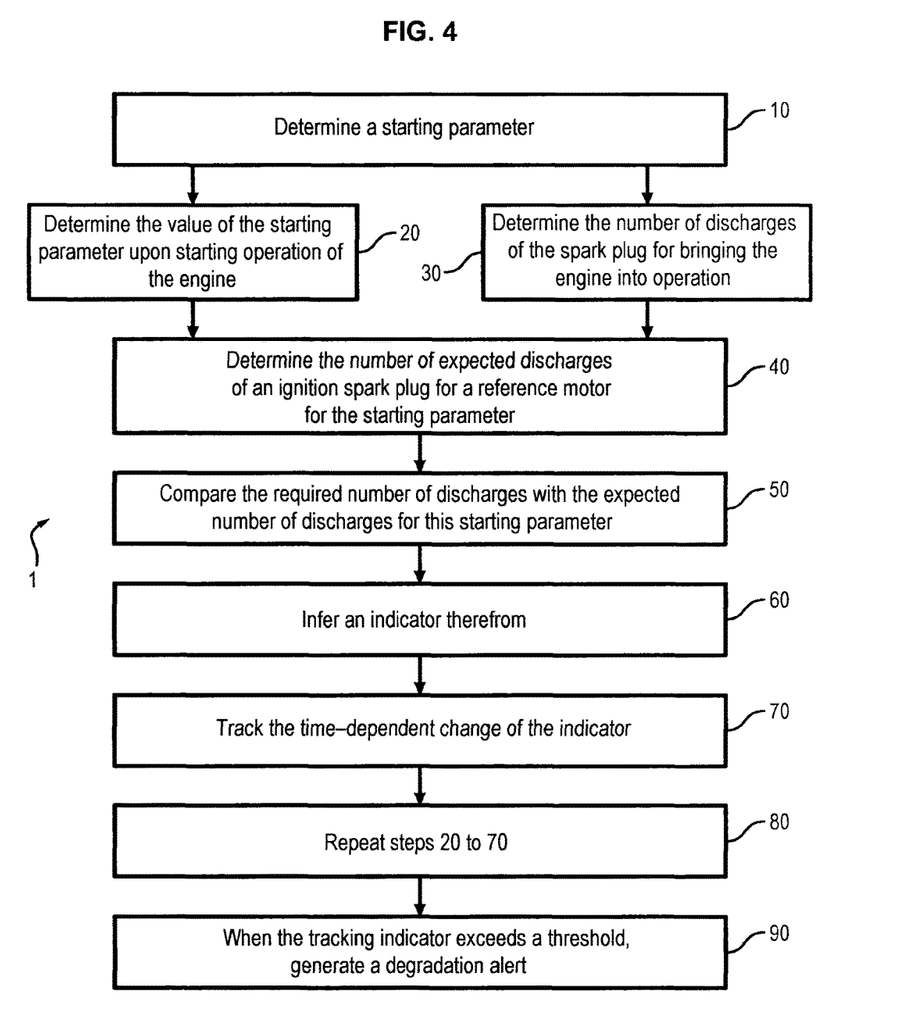
FIG. 4 illustrates various steps of an exemplary embodiment of the monitoring method according to the invention.

A graph illustrating the number of discharges of an ignition spark plug, required for starting a reference engine versus the thermal condition of the engine (EGT temperature) is illustrated in FIG. 3. For this reference engine, the expected number of discharges is 4 when the EGT temperature is less than 10° C., 3 when the EGT temperature is comprised between 10° C. and 80° C., 2 when the EGT temperature is comprised between 80° C. and 190° C., and 1 when the EGT temperature is greater than 190° C.

The possible overlapping areas of the ranges of temperatures are due to the fact that only one parameter of the starting context, here the thermal condition of the engine during its starting, has been taken into account from among the whole of the premises which may have an influence on the ignition of the engine. However, we shall subsequently see that, by means of the selected tracking indicator, the accuracy of the measurements is sufficient for reducing the standard deviation of the measurements to 0.3, as compared with the standard deviation of the order of 1.2 for the conventional indicator. The standard deviation is therefore divided by 4 by means of this monitoring method.

During each starting of the engine, the thermal condition of the engine 20 and the required number of discharges 30 of the ignition spark plug for igniting the fuel-air mixture are then determined. This number of discharges is then compared 50 with the expected number of discharges for this thermal condition, by means of the database, by computing the difference (or residue) between the determined number of discharges and the expected number of discharges in order to obtain an indicator. The time-dependent change of this indicator may then be tracked 70 from one starting operation to another of the turbomachine, for example by means of a moving average.

When the residue or moving average exceeds a defined threshold (step 80), and optionally this excess is confirmed over several flights, it is then inferred therefrom that the system which comes into play in the starting operation of the engine may be degraded. And alerts may then be sent 90 to a designated operator, for example a technician, so that the system may be checked and if necessary repaired.

In the case when the engine comprises more than one ignition spark plug, which is usually the case in most of the present engines of turbomachines, which comprise to ignition spark plugs for redundancy purposes, alternatively use for homogenizing the degradation condition of the system, the residue and if necessary the moving average are computed for each of the spark plugs independently, in order to detect a possible degradation of the system which are associated therewith independently. Therefore, being aware of the ignition spark plug used upon a given starting operation is important in order to determine whether the computed residue corresponds to either one of the spark plugs.

A utilizable tracking indicator is therefore obtained, having a small standard deviation, and easy to obtain. Moreover, given the discretization of the starting time measurements, by means of their conversion into a number of discharges of the ignition spark plug, a degradation may be detected from the moment when the expected number of discharges increases by at least one unit—i.e. when the residue is equal to 1 or more. As a residue of 1 is 3 times greater than the value of the standard deviation (which is of the order of 0.3), it is inferred therefrom that the detection of possible degradations of the system is of good quality, notably as compared with the standard deviation of 1.2 of the usual indicator, with which a small degradation of the system could not be detected because of the noise in the measurements.

The invention claimed is:

1. A method for monitoring an ignition sequence of an engine, the method comprising:
   (i) determining a duration for ignition of the engine for a determined starting parameter comprising a thermal condition of the engine during a starting operation sequence, the ignition duration being determined from a number of discharges of an ignition spark plug of the engine required for a starting operation of the engine;
   (ii) comparing the determined ignition duration of the engine with an expected reference ignition duration for a reference engine and for the starting parameter, by comparing the number of discharges of the ignition spark plug of the engine required for the starting operation of the engine, with an expected number of discharges of an ignition spark plug for a starting operation of the reference engine;
   (iii) inferring an indicator of the starting operation of the engine, the indicator corresponding to a difference between the number of discharges of the ignition spark plug of the engine required for the starting operation of the engine, and the expected number of discharges of the ignition spark plug for the starting operation of the reference engine;

(iv) repeating steps (i) to (iii) for the starting parameter, for each starting operation of the engine of the sequence, and calculating a moving average of the indicator for each starting operation of the engine; and (v) generating a degradation alert of the ignition sequence of the engine when a change in the moving average of the indicator is greater than or equal to a predetermined threshold.

2. The monitoring method according to claim 1, wherein the engine comprises two ignition spark plugs, and the indicator is determined independently for each ignition spark plug.

3. The monitoring method according to claim 1, further comprising determining a set of reference ignition durations for the reference engine and for the starting parameter.

4. A non-transitory computer readable medium including computer executable instructions for executing a method for monitoring a sequence for starting operation of an engine when executed by a computer, the method comprising:

(i) determining a duration for ignition of the engine for a determined starting parameter comprising a thermal condition of the engine during a starting operation sequence, the ignition duration being determined from a number of discharges of an ignition spark plug of the engine required for a starting operation of the engine;

(ii) comparing the determined ignition duration of the engine with an expected reference ignition duration for a reference engine and for the starting parameter, by comparing the number of discharges of the ignition spark plug of the engine required for the starting operation of the engine, with an expected number of discharges of an ignition spark plug for a starting operation of the reference engine;

(iii) inferring an indicator of the starting operation of the engine, the indicator corresponding to a difference between the number of discharges of the ignition spark plug of the engine required for the starting operation of the engine, and the expected number of discharges of the ignition spark plug for the starting operation of the reference engine;

(iv) repeating steps (i) to (iii) for the starting parameter, for each starting operation of the engine of the sequence, and calculating a moving average of the indicator for each starting operation of the engine; and (v) generating a degradation alert of the ignition sequence of the engine when a change in the moving average of the indicator is greater than or equal to a predetermined threshold.

5. A system for monitoring a sequence for starting operation of an engine, notably of a turbomachine, comprising:

means for determining a duration for ignition of the engine for a determined starting parameter comprising a thermal condition of the engine during a starting operation sequence, the ignition duration being determined from a number of discharges of an ignition spark plug of the engine required for a starting operation of the engine;

means for comparing the determined ignition duration of the engine with an expected reference ignition duration for a reference engine and for the starting parameter, by comparing the number of discharges of the ignition spark plug of the engine required for the starting operation of the engine, with an expected number of discharges of an ignition spark plug for a starting operation of the reference engine;

means for inferring an indicator of the starting operation of the engine, the indicator corresponding to a difference between the number of discharges of the ignition spark plug of the engine required for the starting operation of the engine, and the expected number of discharges of the ignition spark plug for the starting operation of the reference engine;

means for recording the indicator for each starting operation of the engine of the sequence;

means for calculating a moving average of the indicator for each starting operation of the engine; and means for generating a degradation alert of the ignition sequence of the engine when a change in the moving average of the indicator is greater than or equal to a predetermined threshold.

* * * * *